United States Patent
Cheng (10) Patent No.: US 9,714,002 B2
(45) Date of Patent: Jul. 25, 2017

(54) SAFETY BELT BUFFERING MECHANISM AND RELATED VEHICLE SAFETY CHAIR

(71) Applicant: Chin-Ming Cheng, N.T. (HK)

(72) Inventor: Chin-Ming Cheng, N.T. (HK)

(73) Assignee: Wonderland Nurserygoods Company Limited, NT (HK)

( * ) Notice: Subject to any disclaimer, the term of this patent is extended or adjusted under 35 U.S.C. 154(b) by 238 days.

(21) Appl. No.: 14/564,114

(22) Filed: Dec. 9, 2014

(65) Prior Publication Data

US 2015/0158456 A1   Jun. 11, 2015

Related U.S. Application Data

(60) Provisional application No. 61/913,929, filed on Dec. 10, 2013.

(51) Int. Cl.
| | |
|---|---|
| *B60R 22/00* | (2006.01) |
| *B60R 22/30* | (2006.01) |
| *F16F 7/12* | (2006.01) |
| *B60N 2/28* | (2006.01) |
| *B60N 2/427* | (2006.01) |

(52) U.S. Cl.
CPC ............ *B60R 22/30* (2013.01); *B60N 2/2812* (2013.01); *B60N 2/2884* (2013.01); *B60N 2/42709* (2013.01); *F16F 7/12* (2013.01)

(58) Field of Classification Search
CPC ..... F16F 7/12; B60N 2/42709; B60N 2/2884; B60N 2/2812; B60R 22/30
See application file for complete search history.

(56) References Cited

U.S. PATENT DOCUMENTS

| | | | |
|---|---|---|---|
| 3,361,475 A | | 1/1968 | Villiers |
| 4,025,111 A | * | 5/1977 | Tanaka ................. B60N 2/2806 |
| | | | 297/216.11 |
| 4,457,251 A | * | 7/1984 | Weman ............. A44B 11/2561 |
| | | | 116/203 |
| D285,383 S | * | 9/1986 | Anthony ...................... D11/218 |

(Continued)

FOREIGN PATENT DOCUMENTS

| | | |
|---|---|---|
| CN | 101164810 A | 4/2008 |
| CN | 101195351 A | 6/2008 |

(Continued)

*Primary Examiner* — David R Dunn
*Assistant Examiner* — Alexander Harrison
(74) *Attorney, Agent, or Firm* — Winston Hsu (57) ABSTRACT

A vehicle safety chair includes a safety belt buffering mechanism applied to a shoulder belt and a crutch belt. The safety belt buffering mechanism includes a first belt connecting component applied to the shoulder belt, a second belt connecting component applied to the crutch belt, and a pivoting component. The first belt connecting component includes a first body whereon a first pivoting hole and a first buffering unit are formed, and a first belt fixing portion disposed on the first body. The first buffering unit is located adjacent to the first pivoting hole. The second belt connecting component is rotatably assembled with the first belt connecting component. The second belt connecting component includes a second body whereon a second pivoting hole is formed and a second belt fixing portion disposed on the second body. The pivoting component passes through the first pivoting hole and the second pivoting hole.

18 Claims, 9 Drawing Sheets

(56) References Cited

U.S. PATENT DOCUMENTS

| | | | | |
|---|---|---|---|---|
| 5,468,046 A | * | 11/1995 | Weber | B60R 22/105 297/216.11 |
| 5,598,900 A | * | 2/1997 | O'Rourke | A62B 35/0056 182/18 |
| 5,997,097 A | * | 12/1999 | Engelhard | B60R 22/28 297/470 |
| 6,471,298 B2 | * | 10/2002 | Carine | B60N 2/2806 297/482 |
| 6,517,154 B2 | | 2/2003 | Sawamoto | |
| 6,837,547 B2 | * | 1/2005 | Delventhal | A44B 11/2549 297/467 |
| 6,916,066 B2 | * | 7/2005 | Sedlack | A47D 13/02 24/198 |
| 7,083,237 B2 | * | 8/2006 | Horton | B60N 2/2884 280/805 |
| 7,299,527 B1 | * | 11/2007 | Gyure | A44B 11/006 24/198 |
| 7,316,451 B2 | * | 1/2008 | Balensiefer | A42B 3/00 297/216.11 |
| 7,644,986 B2 | * | 1/2010 | Berger | B60N 2/2809 297/216.11 |
| 7,922,195 B2 | * | 4/2011 | Nezaki | B60R 21/18 280/730.1 |
| 8,328,275 B2 | * | 12/2012 | Vogt | B60N 2/2812 297/216.11 |
| 8,469,400 B2 | * | 6/2013 | Merrill | B60N 2/24 280/801.1 |
| 8,579,369 B2 | * | 11/2013 | Gaudreau, Jr. | B60N 2/2812 297/216.11 |
| 8,641,096 B1 | * | 2/2014 | Kohlndorfer | B60R 22/28 280/805 |
| 8,672,403 B2 | * | 3/2014 | Mendis | B60N 2/2806 297/216.11 |
| 8,777,322 B2 | * | 7/2014 | Horton | B60N 2/2812 297/216.11 |
| 8,911,015 B2 | * | 12/2014 | Cohen | B60N 2/2812 297/216.11 |
| 9,327,679 B2 | * | 5/2016 | Cheng | B60R 22/28 |
| 9,468,195 B2 | * | 10/2016 | Blizzard | A01K 27/002 |
| 2002/0153760 A1 | * | 10/2002 | Palliser | B60R 22/023 297/472 |
| 2003/0209926 A1 | | 11/2003 | Nakagawa | |
| 2006/0071535 A1 | | 4/2006 | Kim | |
| 2007/0210639 A1 | | 9/2007 | Berger | |
| 2008/0303325 A1 | * | 12/2008 | Scholz | B60N 2/2806 297/250.1 |
| 2012/0025588 A1 | * | 2/2012 | Humbert | B60N 2/24 297/480 |
| 2012/0187742 A1 | * | 7/2012 | Betz | A44B 11/2515 297/480 |
| 2015/0076875 A1 | * | 3/2015 | Cheng | B60N 2/265 297/216.11 |

FOREIGN PATENT DOCUMENTS

| | | |
|---|---|---|
| CN | 101200171 A | 6/2008 |
| CN | 101489827 A | 7/2009 |
| DE | 43 14 034 A1 | 11/1993 |
| DE | 10 2005 060 913 A1 | 6/2007 |
| JP | 9220952 | 8/1997 |

\* cited by examiner

SAFETY BELT BUFFERING MECHANISM AND RELATED VEHICLE SAFETY CHAIR

CROSS REFERENCE TO RELATED APPLICATIONS

This application claims the benefit of U.S. provisional application No. 61/913,929 (which was filed on Dec. 10, 2013). The entire contents of these related applications are incorporated herein by reference.

BACKGROUND OF THE INVENTION

1. Field of the Invention

The present invention relates to a safety belt buffering mechanism and a related vehicle safety chair, and more particularly, to a safety belt buffering mechanism and a related vehicle safety chair utilizing the buffering unit to slow down pulling motion of the shoulder belt.

2. Description of the Prior Art

A conventional vehicle seat includes a safety belt device, which can tie down the passenger to constrain a movement of the passenger and to reduce impact applied to the passenger for protection when the vehicle speeds up and slows down. Generally, a young child or a baby is not suitable for the current safety device except a child safety seat with specific design. The conventional child safety seat is installed on the vehicle seat, and utilizes a housing to shelter the child and/or the baby for safety protection. However, the conventional child safety seat cannot absorb or reduce the impact transmission. The impact may be transmitted to the baby from the housing and results in hurt since the impact applied to the child safety seat is larger than tolerance.

SUMMARY OF THE INVENTION

The present invention provides a safety belt buffering mechanism and a related vehicle safety chair utilizing the buffering unit to slow down pulling motion of the shoulder belt for solving above drawbacks.

According to the claimed invention, a safety belt buffering mechanism includes a first belt connecting component, a second belt connecting component and a pivoting component. The first belt connecting component includes a first body whereon a first pivoting hole and a first buffering unit are formed, and a first belt fixing portion disposed on the first body. The first buffering unit is located adjacent to the first pivoting hole. The second belt connecting component is rotatably assembled with the first belt connecting component. The second belt connecting component includes a second body whereon a second pivoting hole is formed and a second belt fixing portion disposed on the second body. The pivoting component passes through the first pivoting hole and the second pivoting hole. The pivoting component breaks the first pivoting hole to move into the first buffering unit since the first belt connecting component moves relative to the second belt connecting component.

According to the claimed invention, the first buffering unit includes a buffering hole and a vibration absorbing structure. The buffering hole is formed on a side of the first pivoting hole facing the second belt connecting component, and the vibration absorbing structure is located between the buffering hole and the first pivoting hole.

According to the claimed invention, the buffering hole is divided from the first pivoting hole by the vibration absorbing structure.

According to the claimed invention, the first buffering unit includes a buffering hole and a strip-shaped opening. The buffering hole is formed on a side of the first pivoting hole facing the second belt connecting component, and the strip-shaped opening is connected between the buffering hole and the first pivoting hole.

According to the claimed invention, a plurality of protruding structures is disposed on two inner walls of the strip-shaped opening.

According to the claimed invention, a width of the pivoting component is greater than a distance between tips of the protruding structures respectively disposed on the opposite inner walls.

According to the claimed invention, a stretching direction of the strip-shaped opening points toward the second belt connecting component.

According to the claimed invention, the second belt connecting component further includes a second buffering unit formed on the second body and located adjacent to the second pivoting hole.

According to the claimed invention, the pivoting component breaks the first pivoting hole and the second pivoting hole to move into the first buffering unit and the second buffering unit since the first belt connecting component moves relative to the second belt connecting component.

According to the claimed invention, the safety belt buffering mechanism further comprises two second belt connecting components symmetrically disposed on two opposite surfaces of the first belt connecting component by the pivoting component.

According to the claimed invention, a vehicle safety chair with a safety belt buffering function includes a seat whereon a shoulder belt and a crutch belt are movably disposed, and a safety belt buffering mechanism located on a back of the seat. The safety belt buffering mechanism includes a first belt connecting component, a second belt connecting component and a pivoting component. The first belt connecting component includes a first body whereon a first pivoting hole and a first buffering unit are formed, and a first belt fixing portion disposed on the first body. The first buffering unit is located adjacent to the first pivoting hole. The second belt connecting component is rotatably assembled with the first belt connecting component. The second belt connecting component includes a second body whereon a second pivoting hole is formed and a second belt fixing portion disposed on the second body. The pivoting component passes through the first pivoting hole and the second pivoting hole. The pivoting component breaks the first pivoting hole to move into the first buffering unit since the first belt connecting component moves relative to the second belt connecting component The buffering unit is formed on the body of the belt connecting component adjacent to the pivoting hole. When the pivoting component is driven to break surrounding structure of the pivoting hole on the belt connecting component, the buffering unit can be utilized to retard motion of the pivoting component, so that the vehicle safety chair with the safety belt buffering mechanism can ease uncomfortable feeling of the passenger due to the preferred buffering function.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
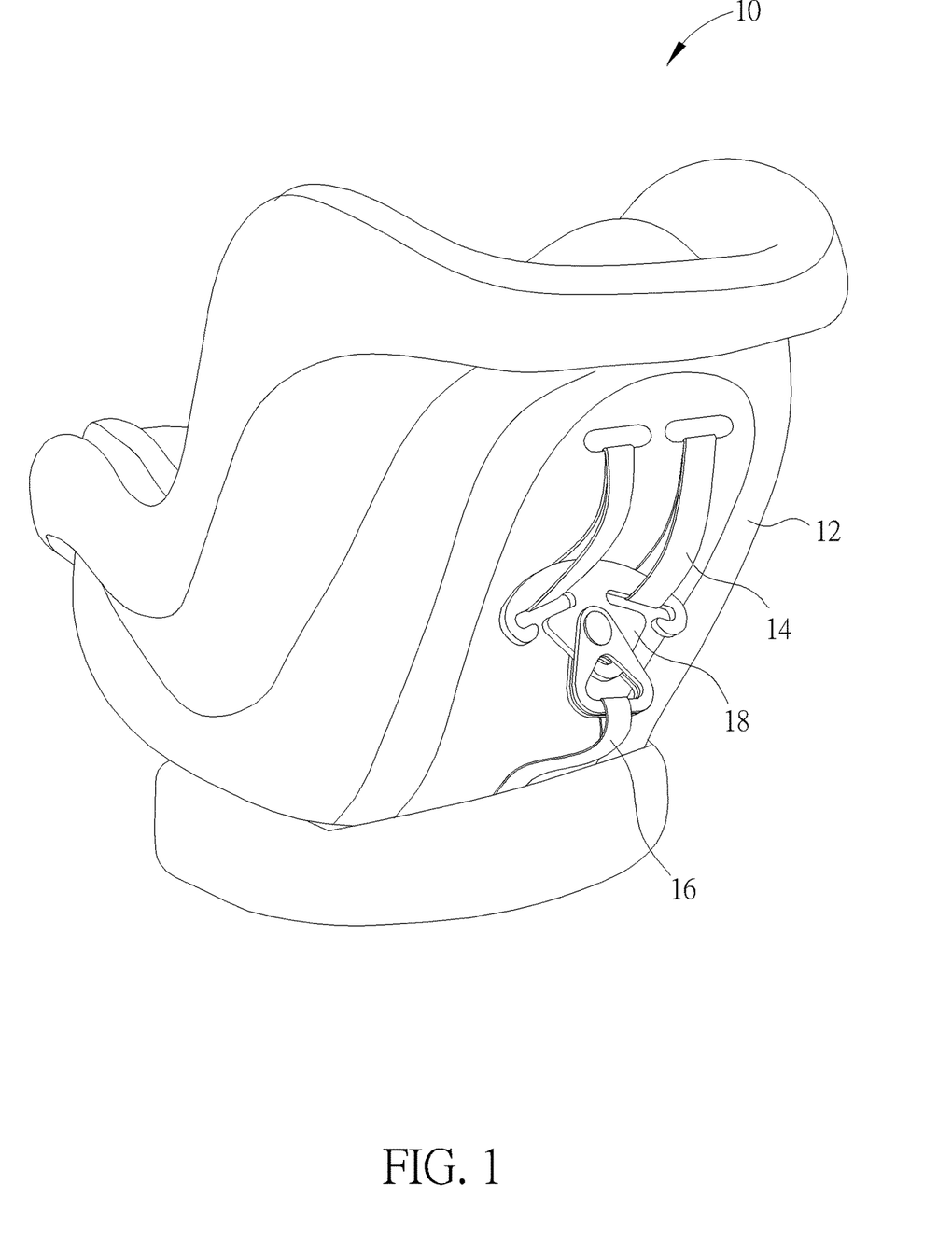
FIG. 1 is a back view of a vehicle safety chair according to an embodiment of the present invention.

Please refer to FIG. 1. FIG. 1 is a back view of a vehicle safety chair 10 according to an embodiment of the present invention. The vehicle safety chair 10 includes a seat 12, a shoulder belt 14, a crutch belt 16 and a safety belt buffering mechanism 18. The shoulder belt 14 and the crutch belt 16 are movably disposed on the seat 12 to constrain a movement of the passenger relative to the seat 12. The shoulder belt 14 is connected to the crutch belt 16 by the safety belt buffering mechanism 18 behind the seat 12, which means the safety belt buffering mechanism 18 is preferably located on a back of the seat 12. Since the vehicle safety chair 10 is impacted, the shoulder belt 14 is pulled due to an inertia force of the passenger sitting on the vehicle safety chair 10, and the safety belt buffering mechanism 18 can be utilized to absorb the foresaid inertia force so as to prevent the passenger from hurt.

Figure 2:
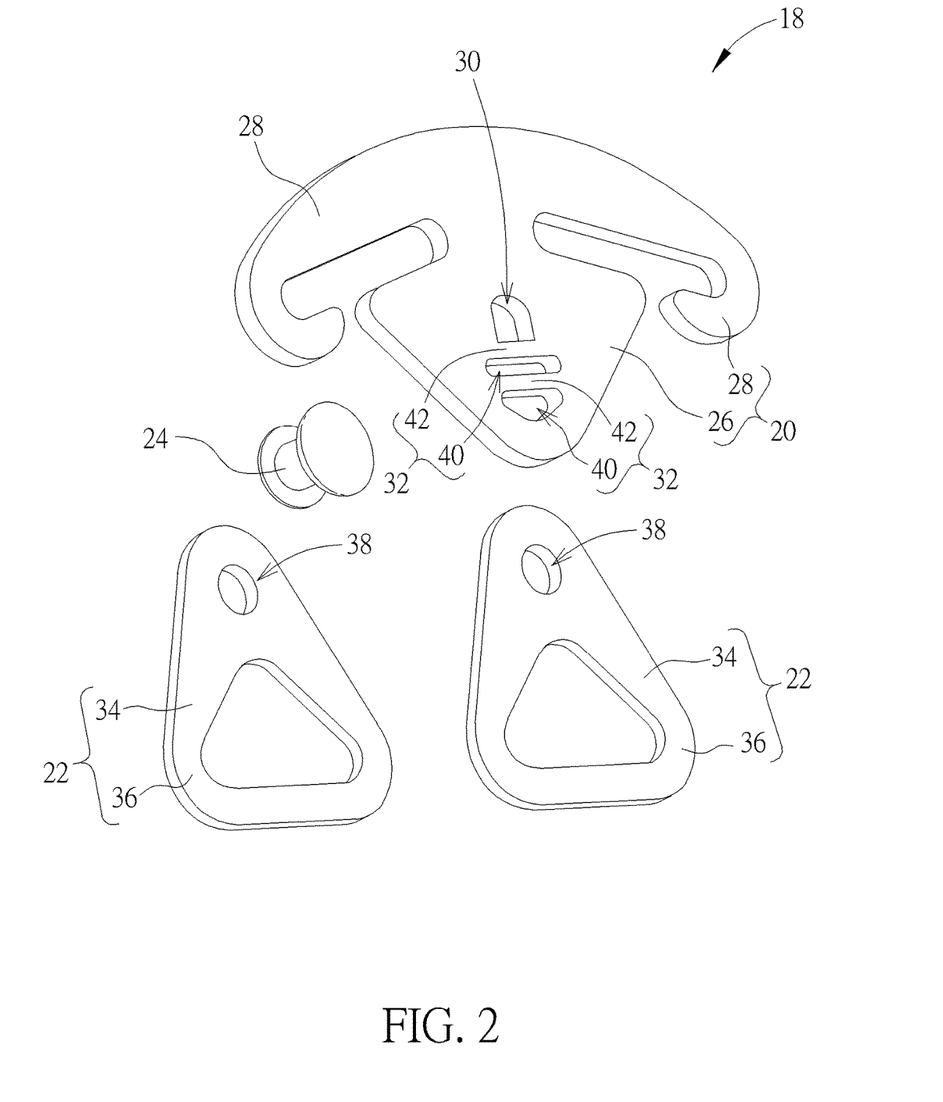
FIG. 2 is an exploded diagram of a safety belt buffering mechanism according to a first embodiment of the present invention.
Figure 3:
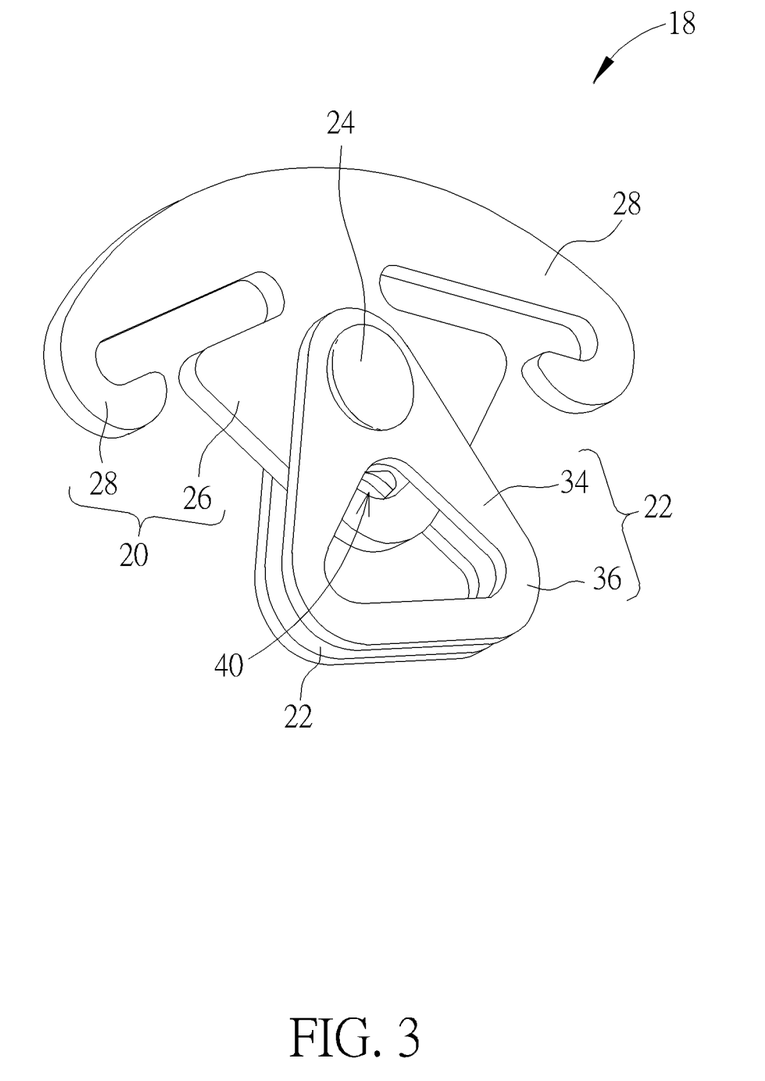
FIG. 3 is an assembly diagram of the safety belt buffering mechanism according to the first embodiment of the present invention.
Figure 4:
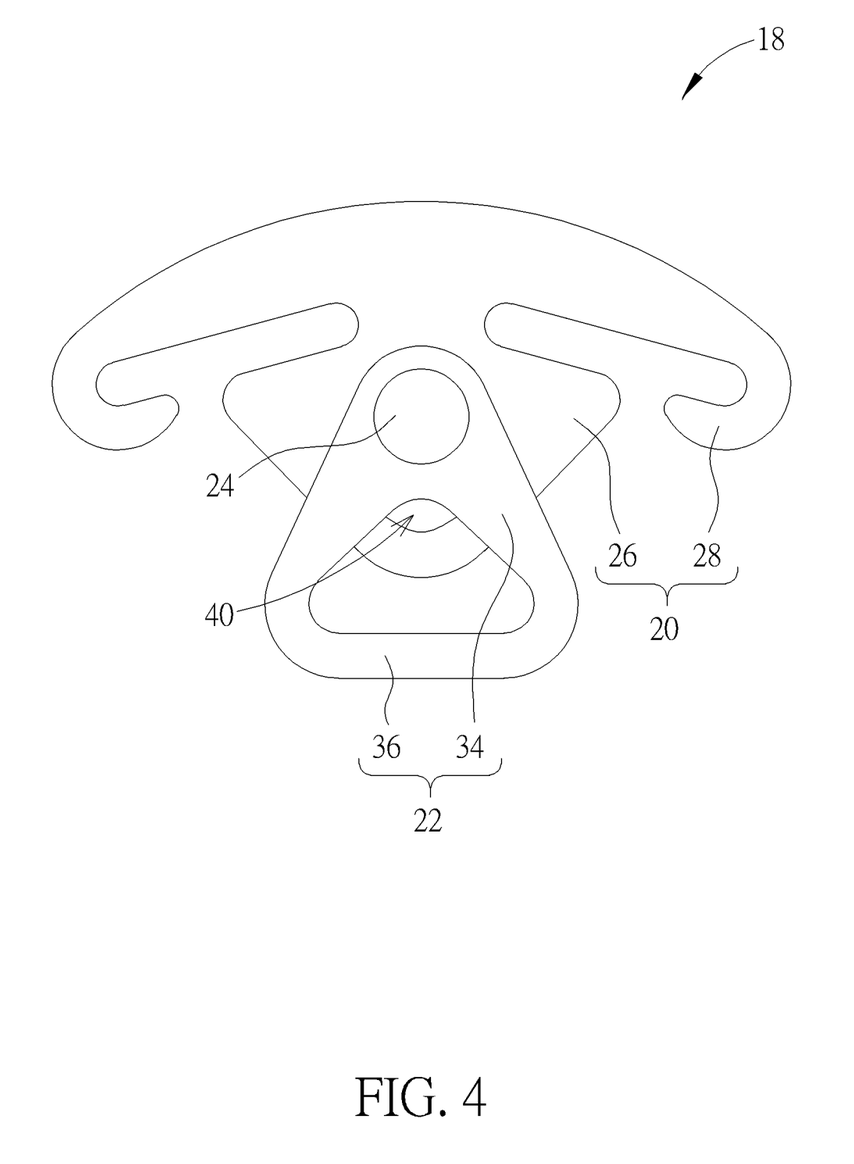
FIG. 4 and FIG. 5 respectively are partial assembly diagrams of the safety belt buffering mechanism in different views according to the first embodiment of the present invention.
Figure 5:
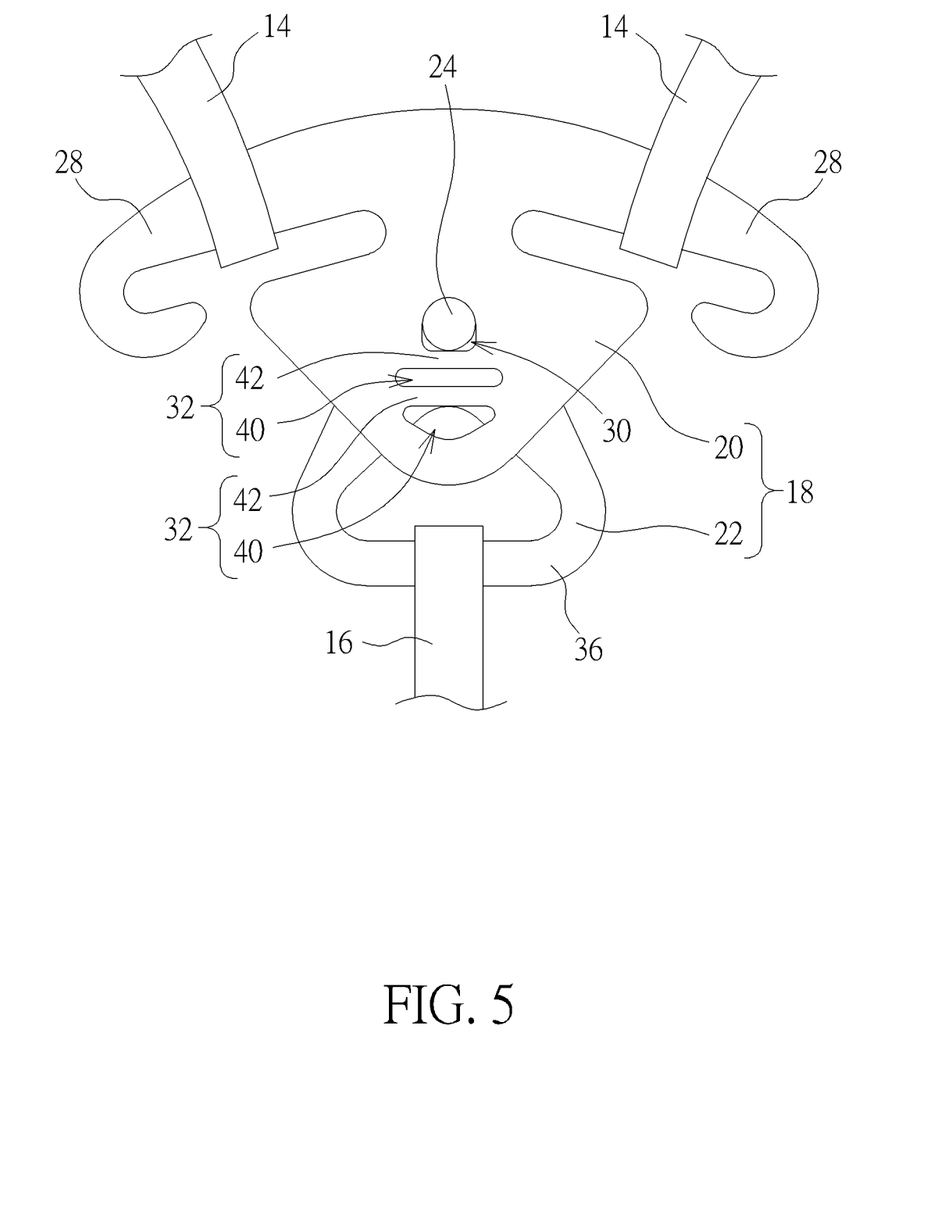

Please refer to FIG. 2 to FIG. 5. FIG. 2 is an exploded diagram of the safety belt buffering mechanism 18 according to a first embodiment of the present invention. FIG. 3 is an assembly diagram of the safety belt buffering mechanism 18 according to the first embodiment of the present invention. FIG. 4 and FIG. 5 respectively are partial assembly diagrams of the safety belt buffering mechanism 18 in different views according to the first embodiment of the present invention. The safety belt buffering mechanism 18 includes a first belt connecting component 20, a second belt connecting component 22 and a pivoting component 24. In the first embodiment, the first belt connecting component 20 is the shoulder belt connecting component connected to the shoulder belt 14, and the second belt connecting component 22 is the crutch belt connecting component connected to the crutch belt 16. However, the first belt connecting component 20 and the second belt connecting component 22 further can be respectively applied to the crutch belt 16 and the shoulder belt 14.

The first belt connecting component 20 includes a first body 26 and at least one first belt fixing portion 28, the first belt fixing portion 28 is disposed on the first body 26 to connect with the shoulder belt 14. A first pivoting hole 30 and at least one first buffering unit 32 are formed on the first body 26, and the first buffering unit 32 is located adjacent to the first pivoting hole 30. An amount of the second belt connecting component 22 is not limited to the first embodiment shown in FIG. 2, which depends on design demand. The second belt connecting component 22 includes a second body 34 and a second belt fixing portion 36. A second pivoting hole 38 is formed on the second body 34, and the second belt fixing portion 36 is disposed on the second body 34 to connect with the crutch belt 16. The pivoting component 24 passes through the first pivoting hole 30 and the second pivoting hole 38 to rotatably assemble the second belt connecting component 22 with the first belt connecting component 20.

The first buffering unit 32 includes a buffering hole 40 and a vibration absorbing structure 42. The buffering hole 40 is formed on a side of the first pivoting hole 30 facing the second belt connecting component 22, and the buffering hole 40 is divided from the first pivoting hole 30 by the vibration absorbing structure 42. The vibration absorbing structure 42 is made of deformable material and located between the buffering hole 40 and the first pivoting hole 30. When the safety belt buffering mechanism 18 is actuated by an external force (such as the inertia force of the passenger), the first belt connecting component 20 is pulled by the shoulder belt 14 and moves away from the second belt connecting component 22. The vibration absorbing structure 42 is pressed by the pivoting component 24. As pressure from the pivoting component 24 is greater than structural strength of the vibration absorbing structure 42, the vibration absorbing structure 42 is deformed or damaged and the pivoting component 24 moves from the first pivoting hole 30 to the buffering hole 40. Therefore, deformation of the vibration absorbing structure 42 can effectively absorb the foresaid external force, and the passenger sitting on the vehicle safety chair 10 is not directly impacted because of the safety belt buffering function.

As shown in FIG. 3, the safety belt buffering mechanism 18 may include two second belt connecting components 22, symmetrically disposed on two opposite surfaces of the first belt connecting component 20. Since the crutch belt 16 is pulled and the external force applied to the safety belt buffering mechanism 18 drives the first buffering unit 32 to be deformed or damaged, the pivoting component 24 are uniformly pulled by the two second belt connecting components 22 arranged in symmetry, and the pivoting component 24 can restrainedly stay in the first pivoting hole 30 or the buffering hole 40 on the first buffering unit 32 instead of being separated from the first belt connecting component 20. That is, the two second belt connecting components 22 in symmetric arrangement are helpful to increase structural stability of the safety belt buffering mechanism 18.

Figure 6:
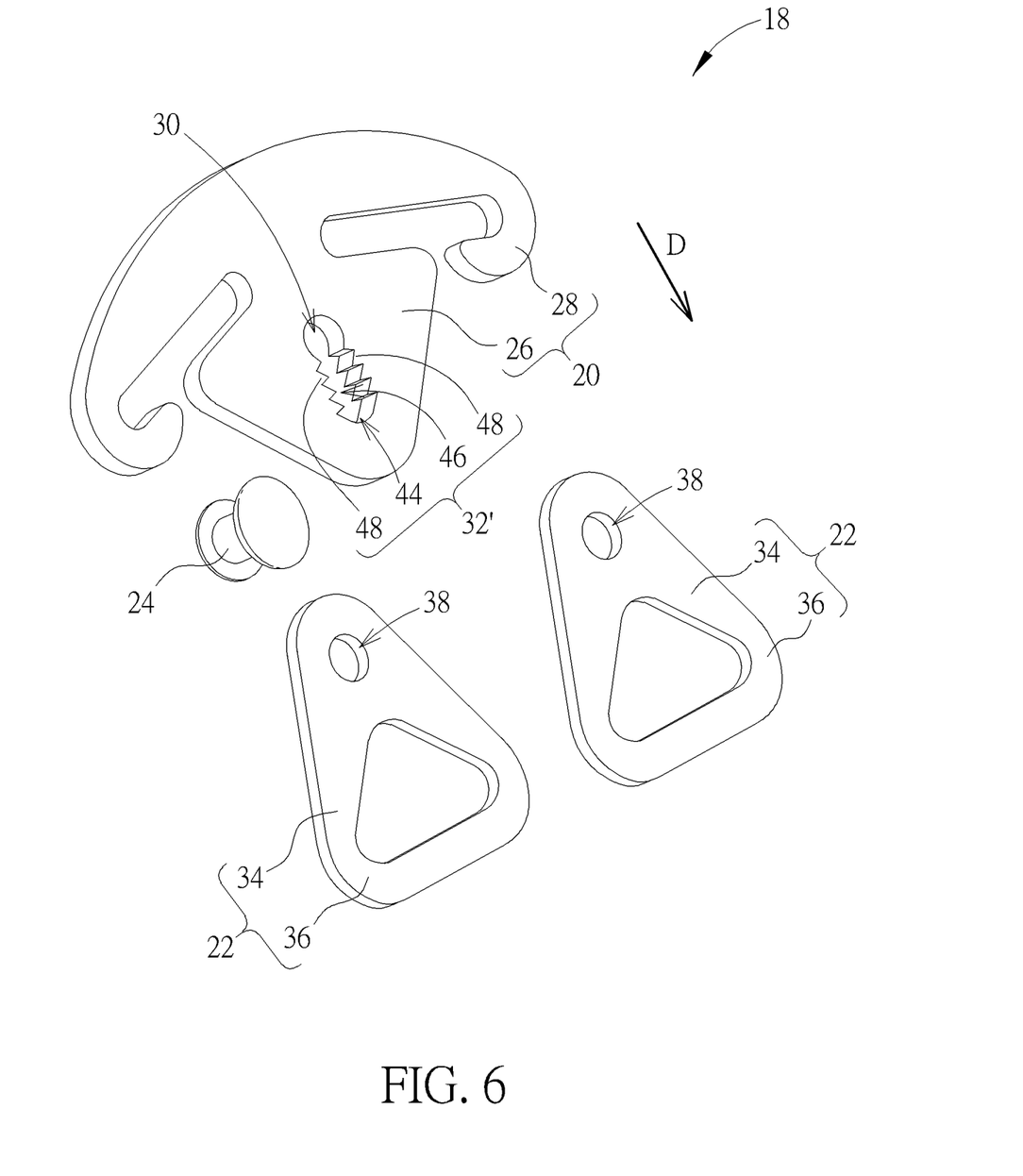
FIG. 6 is an exploded diagram of the safety belt buffering mechanism according to a second embodiment of the present invention.
Figure 7:
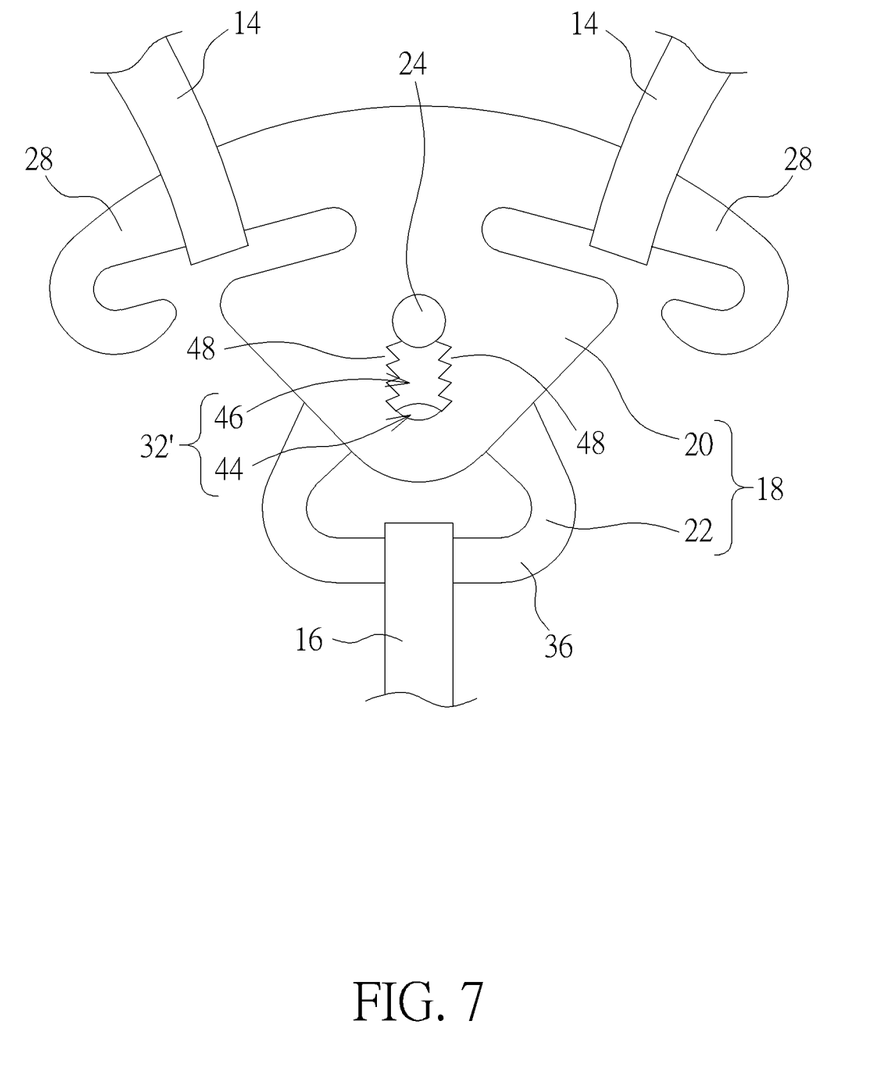
FIG. 7 is a partial assembly diagram of the safety belt buffering mechanism according to the second embodiment of the present invention.

Please refer to FIG. 6 and FIG. 7. FIG. 6 is an exploded diagram of the safety belt buffering mechanism 18 according to a second embodiment of the present invention. FIG. 7 is a partial assembly diagram of the safety belt buffering mechanism 18 according to the second embodiment of the present invention. In the second embodiment, elements having the same numeral as one of the first embodiment have the same structures and functions, and a detailed description is omitted herein for simplicity. The second embodiment provides the first buffering unit 32' including a buffering hole 44 and a strip-shaped opening 46. The buffering hole 44 is formed on a side of the first pivoting hole 30 facing the second belt connecting component 22, and the strip-shaped opening 46 is connected between the buffering hole 44 and the first pivoting hole 30 to be a tracking channel. A plurality of protruding structures 48 is disposed on two opposite inner walls of the strip-shaped opening 46, and a width of the pivoting component 24 is greater than a distance between tips of the protruding structures 48 respectively disposed on the opposite inner walls of the strip-shaped opening 46. Bottoms of the protruding structures 48 are connected to the inner walls.

The second embodiment utilizes deformation of the protruding structures 48 and/or friction between the pivoting component 24 and the protruding structures 48 to absorb the external force. For example, the first belt connecting component 20 is pulled by the shoulder belt 14 when the safety belt buffering mechanism 18 is impacted by the external force, the first belt connecting component 20 moves relative to the second belt connecting component 22 to shift the pivoting component 24 from the first pivoting hole 30 to the buffering hole 44. As the pivoting component 24 passes through the tracking channel between the first pivoting hole 30 and the buffering hole 44, the pivoting component 24 slidably contacts against the protruding structures 48 and the protruding structures 48 may be deformed by pressure from the pivoting component 24 to slow down a movement of the pivoting component 24 by the friction retardation. The protruding structures 48 can be any shape, such as a cylinder structure, a toothed structure or a cone structure. A stretching direction D of the strip-shaped opening 46 points toward the second belt connecting component 22 to constrain the relative movement between the first belt connecting component 20 and the second belt connecting component 22.

Figure 8:
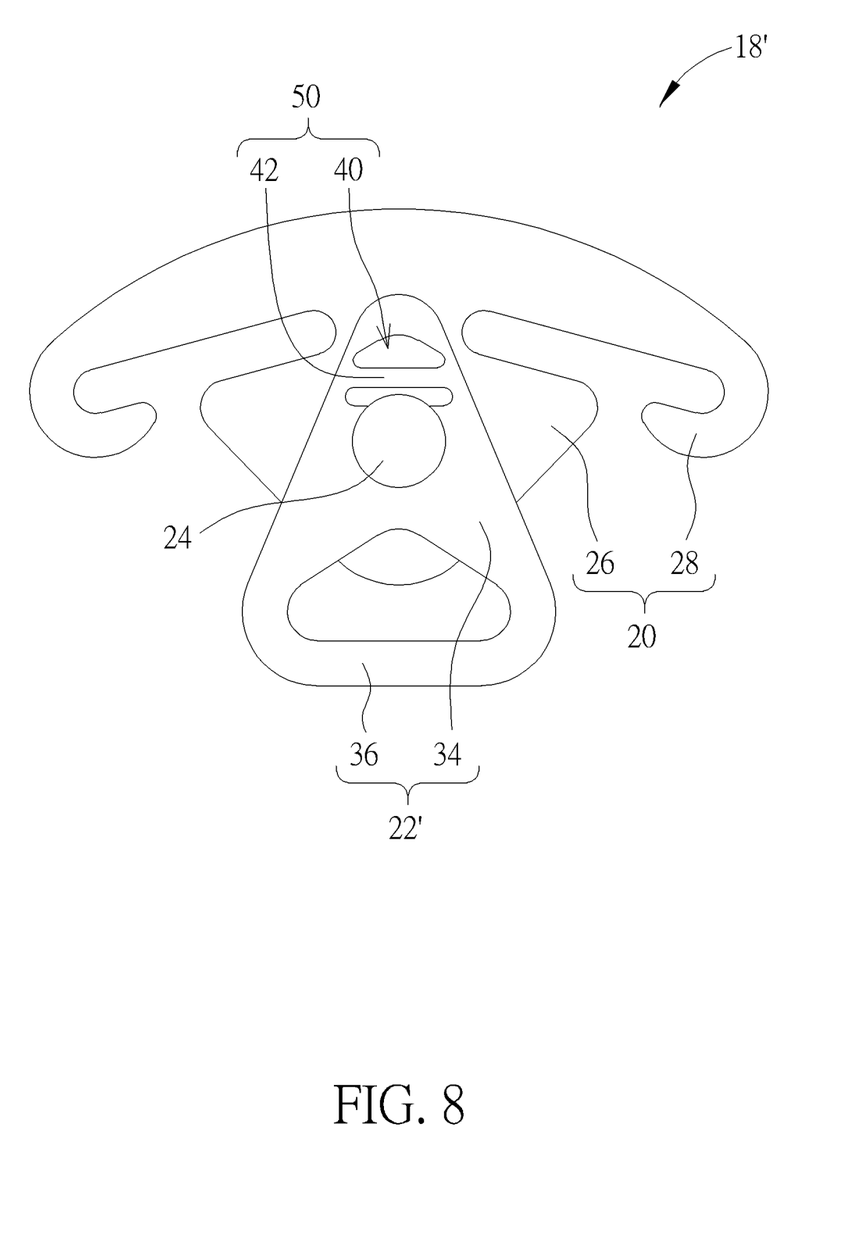
FIG. 8 and FIG. 9 respectively are partial assembly diagrams of the safety belt buffering mechanism according to different embodiments of the present invention.
Figure 9:
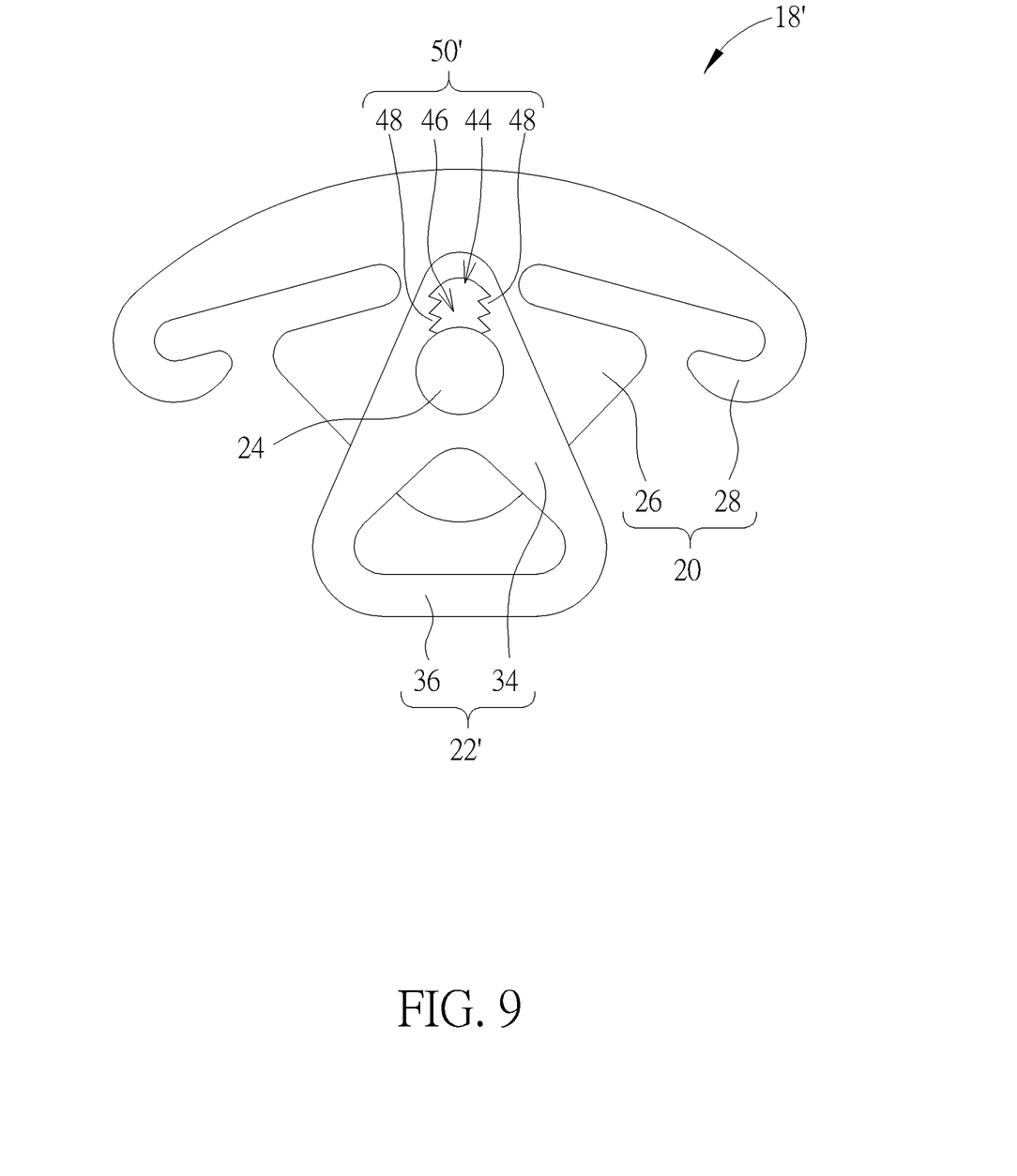

Please refer to FIG. 8 and FIG. 9. FIG. 8 and FIG. 9 respectively are partial assembly diagrams of the safety belt buffering mechanism 18' according to different embodiments of the present invention. In the above-mentioned embodiments, elements having the same numeral as one of the first embodiment and the second embodiment have the same structures and functions, and a detailed description is omitted herein for simplicity. As shown in FIG. 8, the safety belt buffering mechanism 18' further includes a second buffering unit 50 formed on the second body 34 and located adjacent to the second pivoting hole 38 (not shown in FIG. 8) of the second belt connecting component 22'. The second buffering unit 50 includes the buffering hole 40 and the vibration absorbing structure 42. The vibration absorbing structure 42 may be pressed by the pivoting component 24 when the safety belt buffering mechanism 18 is impacted, the vibration absorbing structure 42 is deformed or damaged to absorb the external force so as to comfort the passenger sitting on the vehicle safety chair 10.

As shown in FIG. 9, the second buffering unit 50' includes the buffering hole 44, the strip-shaped opening 46 and the protruding structures 48. The buffering hole 44 is formed on the second body 34 of the second belt connecting component 22', and located on the side of the second pivoting hole 38 (not shown in FIG. 9) facing the first belt connecting component 20. The pivoting component 24 is retarded by the protruding structures 48 since the pivoting component 24 moves from the second pivoting hole 38 to the buffering hole 44 by pulling motion of the shoulder belt 14, so that the second belt connecting component 22' with the second buffering unit 50 can apply sufficient safety protection to the passenger sitting on the vehicle safety chair 10.

In the present invention, the safety belt buffering mechanism can dispose single buffering unit on the shoulder belt connecting component or the crutch belt connecting component, or dispose two buffering units respectively on the shoulder belt connecting component and the crutch belt connecting component, or dispose two buffering units only on the shoulder belt connecting component or the crutch belt connecting component. The single buffering unit may be assembly of the buffering hole and the vibration absorbing structure, or assembly of the buffering hole, the strip-shaped opening and the protruding structures. Since the safety belt buffering mechanism includes two buffering units, one of the buffering units can be the assembly of the buffering hole and the vibration absorbing structure, and another buffering unit can be the assembly of the buffering hole, the strip-shaped opening and the protruding structures; however, both of the two buffering units are allowed to be the same assembly as mentioned above.

As the external force is not applied to the safety belt buffering mechanism, the pivoting component cannot be separated from the first pivoting hole and the second pivoting hole by block of the first buffering unit and/or the second buffering unit. The first buffering unit and/or the second buffering unit are utilized to resist separation of the pivoting component from the first and second pivoting holes since the external force is applied to the safety belt buffering mechanism and smaller than structural strength of the first buffering unit and/or the second buffering unit. When the external force is greater than the structural strength of the first buffering unit and/or the second buffering unit, the first buffering unit and/or the second buffering unit are deformed or damaged by pressure of the pivoting component, so as to provide buffering function.

Comparing to the prior art, the buffering unit is formed on the body of the belt connecting component adjacent to the pivoting hole. When the pivoting component is driven to break surrounding structure of the pivoting hole on the belt connecting component, the buffering unit can be utilized to retard motion of the pivoting component, so that the vehicle safety chair with the safety belt buffering mechanism can ease uncomfortable feeling of the passenger due to the preferred buffering function.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A safety belt buffering mechanism, comprising:
a first belt connecting component, the first belt connecting component comprising:
a first body whereon a first pivoting hole and a first buffering unit are formed, the first buffering unit being located adjacent to the first pivoting hole; and
a first belt fixing portion disposed on the first body;
two second belt connecting components rotatably assembled with the first belt connecting component, each second belt connecting component comprising:
a second body whereon a second pivoting hole is formed; and
a second belt fixing portion disposed on the second body; and
a pivoting component passing through the first pivoting hole and the second pivoting hole, the two second belt connecting components being symmetrically disposed on two opposite surfaces of the first belt connecting component by the pivoting component, wherein the pivoting component is adapted to break the first pivoting hole to move into the first buffering unit when the first belt connecting component moves relative to the second belt connecting component.

2. The safety belt buffering mechanism of claim 1, wherein the first buffering unit comprises a buffering hole and a vibration absorbing structure, the buffering hole is formed on a side of the first pivoting hole facing the second belt connecting component, and the vibration absorbing structure is located between the buffering hole and the first pivoting hole.

3. The safety belt buffering mechanism of claim 2, wherein the buffering hole is divided from the first pivoting hole by the vibration absorbing structure.

4. The safety belt buffering mechanism of claim 1, wherein the first buffering unit comprises a buffering hole and a strip-shaped opening, the buffering hole is formed on a side of the first pivoting hole facing the second belt connecting component, and the strip-shaped opening is connected between the buffering hole and the first pivoting hole.

5. The safety belt buffering mechanism of claim 4, wherein a plurality of protruding structures is disposed on two inner walls of the strip-shaped opening.

6. The safety belt buffering mechanism of claim 5, wherein a width of the pivoting component is greater than a distance between tips of the protruding structures respectively disposed on the opposite inner walls.

7. The safety belt buffering mechanism of claim 4, wherein a stretching direction of the strip-shaped opening points toward the second belt connecting component.

8. The safety belt buffering mechanism of claim 1, wherein the second belt connecting component further comprises a second buffering unit formed on the second body and located adjacent to the second pivoting hole.

9. The safety belt buffering mechanism of claim 8, wherein the pivoting component breaks the first pivoting hole and the second pivoting hole to move into the first buffering unit and the second buffering unit since the first belt connecting component moves relative to the second belt connecting component.

10. A vehicle safety chair with a safety belt buffering function, comprising:
   a seat whereon a shoulder belt and a crutch belt are movably disposed; and
   a safety belt buffering mechanism located on a back of the seat, the safety belt buffering mechanism comprising:
      a first belt connecting component, the first belt connecting component comprising:
         a first body whereon a first pivoting hole and a first buffering unit are formed, the first buffering unit being located adjacent to the first pivoting hole; and
         a first belt fixing portion disposed on the first body;
      at least one two second belt connecting components rotatably assembled with the first belt connecting component, each second belt connecting component comprising:
         a second body whereon a second pivoting hole is formed; and
         a second belt fixing portion disposed on the second body, wherein the shoulder belt and the crutch belt are respectively connected to the first belt fixing portion and the second belt fixing portion; and
      a pivoting component passing through the first pivoting hole and the second pivoting hole, the two second belt connecting components being symmetrically disposed on two opposite surfaces of the first belt connecting component by the pivoting component, wherein the pivoting component is adapted to break the first pivoting hole to move into the first buffering unit when the first belt connecting component moves relative to the second belt connecting component.

11. The vehicle safety chair of claim 10, wherein the first buffering unit comprises a buffering hole and a vibration absorbing structure, the buffering hole is formed on a side of the first pivoting hole facing the second belt connecting component, and the vibration absorbing structure is located between the buffering hole and the first pivoting hole.

12. The vehicle safety chair of claim 11, wherein the buffering hole is divided from the first pivoting hole by the vibration absorbing structure.

13. The vehicle safety chair of claim 10, wherein the first buffering unit comprises a buffering hole and a strip-shaped opening, the buffering hole is formed on a side of the first pivoting hole facing the second belt connecting component, and the strip-shaped opening is connected between the buffering hole and the first pivoting hole.

14. The vehicle safety chair of claim 13, wherein a plurality of protruding structures is disposed on two inner walls of the strip-shaped opening.

15. The vehicle safety chair of claim 14, wherein a width of the pivoting component is greater than a distance between tips of the protruding structures respectively disposed on the opposite inner walls.

16. The vehicle safety chair of claim 13, wherein a stretching direction of the strip-shaped opening points toward the second belt connecting component.

17. The vehicle safety chair of claim 10, wherein the second belt connecting component further comprises a second buffering unit formed on the second body and located adjacent to the second pivoting hole.

18. The vehicle safety chair of claim 17, wherein the pivoting component breaks the first pivoting hole and the second pivoting hole to move into the first buffering unit and the second buffering unit since the first belt connecting component moves relative to the second belt connecting component.

* * * * *